(12) United States Patent
Iwasaki et al.

(10) Patent No.: US 11,838,633 B2
(45) Date of Patent: Dec. 5, 2023

(54) CAMERA DEVICE HAVING A FLEXIBLE SUBSTRATE FOR IMAGE STABILIZATION MECHANISM WITH A COIL ON ITS SURFACE

(71) Applicant: AAC Optics (Nanning) Co., Ltd., Nanning (CN)

(72) Inventors: Takashi Iwasaki, Osaka (JP); Kazuo Shikama, Osaka (JP)

(73) Assignee: AAC Optics (Nanning) Co., Ltd., Nanning (CN)

( * ) Notice: Subject to any disclaimer, the term of this patent is extended or adjusted under 35 U.S.C. 154(b) by 0 days.

(21) Appl. No.: 17/741,381

(22) Filed: May 10, 2022

(65) Prior Publication Data

US 2023/0319409 A1 Oct. 5, 2023

(30) Foreign Application Priority Data

Mar. 31, 2022 (JP) .................. 2022-059565

(51) Int. Cl.
 *H04N 23/68* (2023.01)
 *H04N 23/54* (2023.01)
 *H04N 23/67* (2023.01)
(52) U.S. Cl.
 CPC .......... *H04N 23/686* (2023.01); *H04N 23/54* (2023.01); *H04N 23/67* (2023.01)

(58) Field of Classification Search
 CPC ....... H04N 23/686; H04N 23/54; H04N 23/67
 See application file for complete search history.

(56) References Cited

U.S. PATENT DOCUMENTS

| | | | |
|---|---|---|---|
| 2016/0241787 A1* | 8/2016 | Sekimoto | H04N 23/54 |
| 2017/0176768 A1* | 6/2017 | Kim | G02B 27/646 |
| 2019/0104239 A1* | 4/2019 | Aschwanden | H04N 23/6811 |
| 2020/0314338 A1* | 10/2020 | Johnson | H04N 23/68 |
| 2021/0227142 A1* | 7/2021 | Sharma | H04N 23/687 |

* cited by examiner

*Primary Examiner* — Gevell V Selby
(74) *Attorney, Agent, or Firm* — W&G Law Group

(57) ABSTRACT

Provided is a camera device, including: a case having a receiving cavity; a focus adjustment mechanism installed to a camera lens having an optical axis; and an image stabilization mechanism, the image stabilization mechanism and the focus adjustment mechanism being arranged along a direction of the optical axis. The focus adjustment mechanism includes a focus adjustment magnet and a first base. The image stabilization mechanism includes a second base and a flexible substrate fixed to the second base, the flexible substrate is configured with and electrically connected to a first coil, the first coil corresponds to and is spaced from the focus adjustment magnet in a direction perpendicular to the direction of the optical axis, and the first coil interacts with the focus adjustment magnet when being energized, to drive the flexible substrate to move in a plane orthogonal to the direction of the optical axis.

8 Claims, 10 Drawing Sheets

CAMERA DEVICE HAVING A FLEXIBLE SUBSTRATE FOR IMAGE STABILIZATION MECHANISM WITH A COIL ON ITS SURFACE

TECHNICAL FIELD

The present invention relates to the technical field of anti-shake cameras, and in particular, to a camera device.

BACKGROUND

Nowadays, high-performance camera lens modules are installed to devices such as smartphones, tablet computers, and action cameras. High-performance camera lens modules generally have an auto-focusing function and an optical image stabilization function.

The auto-focus function works by pushing the camera lens to move along an optical axis through an auto-focusing mechanism including a voice coil motor. The optical image stabilization function works by pushing the camera lens to move in a plane perpendicular to the optical axis through an image stabilization mechanism of the voice coil motor. The high-performance camera lens module further includes a position detection component for detecting a position of the camera lens along the optical axis and on a plane perpendicular to the optical axis. Other components such as the voice coil motor, the position detection component, and the camera component are connected to a control circuit on a flexible substrate through power lines and signal lines.

As the number of power lines and signal lines increases, the strength of the flexible substrate also increases gradually, and the flexible substrate is not easily deformed flexibly. When the image stabilization mechanism is used to realize the optical stabilization function, the flexible substrate generates a large counterforce to the image stabilization mechanism through the power lines and the signal lines, thereby hindering movement of the image stabilization mechanism.

SUMMARY

The present invention provides a camera device that improves the accuracy of the movement of the image stabilization mechanism, thereby improving the image clarity and the user experience.

An embodiment of the present invention provides a camera device that can be applied to the field of image stabilization technology, and the camera device includes: a case having a receiving cavity; a focus adjustment mechanism received in the receiving cavity and installed to a camera lens having an optical axis; and an image stabilization mechanism received in the receiving cavity. The image stabilization mechanism and the focus adjustment mechanism are arranged along a direction of the optical axis. The focus adjustment mechanism includes a focus adjustment magnet and a first base, the first base is arranged at an object side of the image stabilization mechanism along the direction of the optical axis, and the focus adjustment magnet is arranged at the first base. The image stabilization mechanism includes a second base and a flexible substrate for the image stabilization mechanism fixed to the second base, the flexible substrate for the image stabilization mechanism is configured with and electrically connected to a first coil, the first coil corresponds to the focus adjustment magnet and is spaced from the focus adjustment magnet in a direction perpendicular to the direction of the optical axis, and the first coil interacts with the focus adjustment magnet when being energized, to drive the flexible substrate for the image stabilization mechanism to move in a plane orthogonal to the direction of the optical axis.

The flexible substrate for the image stabilization mechanism can supply current to the first coil. When the first coil is supplied with current, according to Ampere's law, the first coil generates a magnetic field, and the electromagnetic field of the first coil interacts with a magnetic field of the focus adjustment magnet. Since the focus adjustment magnet is installed to the first base, the focus adjustment magnet remains stationary, so the first coil can drive the flexible substrate for the image stabilization mechanism to move. A magnetic pole of the focus adjustment magnet is unchanged, the flexible substrate for the image stabilization mechanism can control a magnitude and a direction of the current in the first coil, thereby controlling the direction of the magnetic pole and the intensity of the magnetic field of the first coil. That is, an electromagnetic force between the first coil and the focus adjustment magnet can be controlled, thereby controlling movement of the flexible substrate for the image stabilization mechanism, so that the flexible substrate for the image stabilization mechanism can follow the movement of the image stabilization mechanism inside the camera device provided by this embodiment of the present invention. A counterforce of a power line and a signal line of the flexible substrate for the image stabilization mechanism applied to the image stabilization mechanism is reduced, thereby improving an accuracy of the movement of the image stabilization mechanism, and thus improving the image clarity and user experience.

In an improvement embodiment, the flexible substrate for the image stabilization mechanism includes a fixed part fixed to the second base, a first curved surface bent and extending from the fixed part and a second curved surface bent and extending from the first curved surface; the first curved surface and the second curved surface are parallel to the direction of the optical axis, the first curved surface is perpendicular to the second curved surface, the first curved surface and the second curved surface are each provided with the first coil.

In an improvement embodiment, the first coil is a multi-layer coil winding configured on each of the first curved surface and the second curved surface, or the first coil is an electric-conductive circuit printed on each of the first curved surface and the second curved surface.

In an improvement embodiment, the image stabilization mechanism further includes a movable frame supported on the second base, a coil for image stabilization installed to the movable frame, and a magnet for image stabilization installed to the second base; and the camera device further includes a camera assembly installed to the movable frame. The coil for image stabilization interacts with the magnet for image stabilization when being energized, so as to drive the movable frame to drive the camera assembly to move in a plane orthogonal to the direction of the optical axis.

In an improvement embodiment, the flexible substrate for the image stabilization mechanism further includes a third curved surface extending from the second curved surface in a direction perpendicular to the direction of the optical axis and electrically connected to the camera assembly.

In an improvement embodiment, a surface of the second base facing the movable frame is provided with a first groove, a surface of the movable frame facing the second base is provided with a second groove corresponding to the first groove, and the image stabilization mechanism further includes a support member received in a receiving space formed between the first groove and the second groove; and the movable frame is movably supported on the second base through the support member.

In an improvement embodiment, the image stabilization mechanism further includes an electric-conductive support plate fixed to a side of the movable frame facing the second base, and the coil for image stabilization is carried by the electric-conductive support plate and electrically connected to the flexible substrate for the image stabilization mechanism through the electric-conductive support plate to achieve electrical connection with an external circuit.

In an improvement embodiment, the focus adjustment mechanism is an auto-focusing mechanism, including an auto-focusing holder sleeved on the camera lens and a plate spring connecting the auto-focusing holder and the first base. The auto-focusing holder is wound with a focus adjustment coil, the focus adjustment coil corresponds to the focus adjustment magnet and is spaced from the focus adjustment magnet, the focus adjustment coil interacts with the focus adjustment magnet to drive the auto when being energized, so as to drive the auto-focusing holder and the camera lens are to move along the direction of the optical axis.

In an improvement embodiment, the focus adjustment mechanism is a zoom mechanism, the camera lens includes at least two lenses arranged along the direction of the optical axis and spaced from each other, and the zoom mechanism is capable of changing a distance between the two lenses along the direction of the optical axis.

In an improvement embodiment, the camera device further includes a prism located at one or both of an object side of the camera lens and an image side of the camera lens. The prism is configured to change the direction of an optical path.

It should be understood that the foregoing general description and the following detailed description are exemplary only and do not limit the present invention.

REFERENCE NUMERALS

Figure 1:
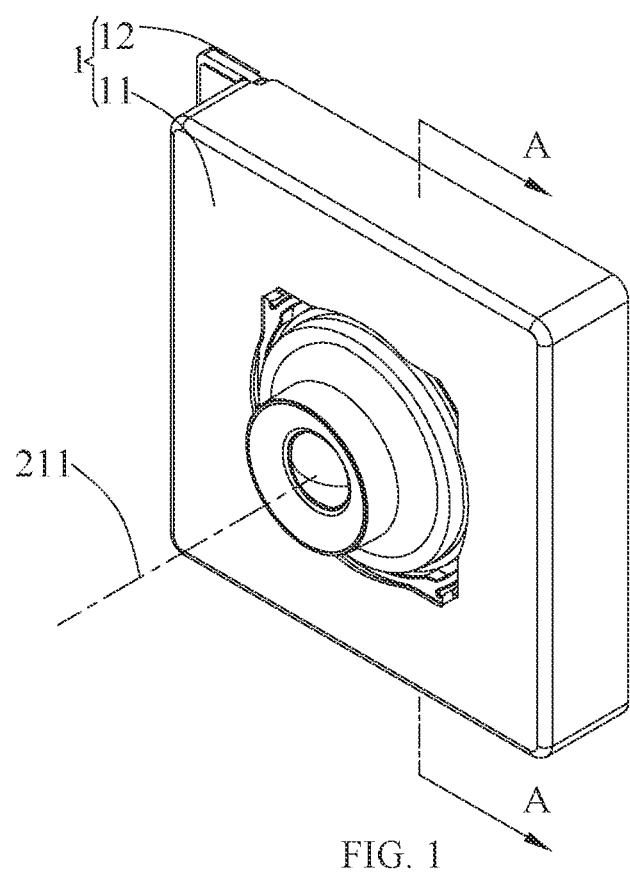
FIG. 1 is a perspective view of a camera device according to an embodiment of the present invention.
Figure 2:
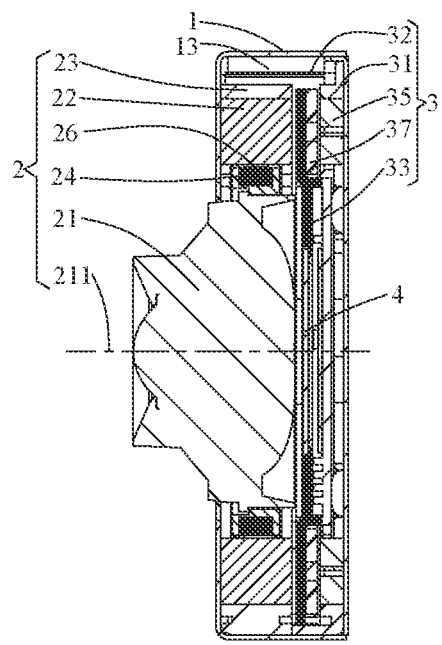
FIG. 2 is a cross-sectional view along A-A as shown in FIG. 1.

1—case;
   11—front case body;
   12—rear case body;
   13—receiving cavity;
2—focus adjustment mechanism;
   21—camera lens;
      211—optical axis;
      212—lens;
   22—focus adjustment magnet;
   23—first base;
   24—auto-focusing holder;
   25—plate spring;
      251—upper plate spring;
      252—lower plate spring;
   26—focus adjustment coil;
   27—focus adjustment flexible substrate;
   28—first position detection component;
   29—first position detection magnet;
3—image stabilization mechanism;
   31—second base;
      311—first groove;
   32—flexible substrate for the image stabilization mechanism;
      321—fixed part;
      322—first curved surface;
      323—second curved surface;
      324—first coil;
      325—third curved surface;
   33—movable frame;
      331—second groove;
      332—anti-vibration buffer;
      333—heat dissipation gel;
   34—coil for image stabilization;
   35—magnet for image stabilization;
   36—support member;
      361—first support plate;
      362—second support plate;
      363—ball;
   37—electric-conductive support plate;
   38—second position detection component;
4—camera assembly;
5—prism;
6—optical path.

DETAILED DESCRIPTION OF EMBODIMENTS

The drawings herein are incorporated into and constitute a part of the present specification, illustrate embodiments of the present invention and explain principles of the present invention together with the specification.

For better illustrating technical solutions of the present invention, embodiments of the present invention will be described in detail as follows with reference to the accompanying drawings.

It should be noted that, the described embodiments are merely exemplary embodiments of the present invention, which shall not be interpreted as providing limitations to the present invention. All other embodiments obtained by those skilled in the art without creative efforts according to the embodiments of the present invention are within the scope of the present invention.

The terms used in the embodiments of the present invention are merely for the purpose of describing particular embodiments but not intended to limit the present invention. Unless otherwise noted in the context, the singular form expressions "a", "an", "the" and "said" used in the embodiments and appended claims of the present invention are also intended to represent plural form expressions thereof.

It should be understood that the term "and/or" used herein is merely an association relationship describing associated objects, indicating that there may be three relationships, for example, A and/or B may indicate that three cases, i.e., A existing individually, A and B existing simultaneously, B existing individually. In addition, the character "/" herein generally indicates that the related objects before and after the character form an "or" relationship.

It should be understood that, the terms such as "upper", "lower", "left", "right" and the like are used to indicate positions shown in the drawing, instead of being construed as limitations of the embodiment of the present invention. In addition, when an element is described as being "on" or "under" another element in the context, it should be understood that the element can be directly or via an intermediate element located "on" or "under" another element.

An embodiment of the present invention provides a camera device, which can be applied to the technical field of image stabilization. With reference to FIG. 1 to FIG. 11, the camera device includes a case 1, a focus adjustment mechanism 2 and an image stabilization mechanism 3. A receiving cavity 13 is formed in the case 1, and the focus adjustment mechanism 2 is received in the receiving cavity 13 and is installed with a camera lens 21 having an optical axis 211. The image stabilization mechanism 3 is received in the receiving cavity 13, and the image stabilization mechanism 3 and the focus adjustment mechanism 2 are arranged in a direction of the optical axis 211. The focus adjustment mechanism 2 includes a focus adjustment magnet 22 and a first base 23. The first base 23 is arranged at a side of the image stabilization mechanism 3 that is close to an object (an object to be photographed) in the direction of the optical axis 211. The focus adjustment magnet 22 is arranged at the first base 23. The image stabilization mechanism 3 includes a second base 31 and a flexible substrate 32 for the image stabilization mechanism fixed to the second base 31. The flexible substrate 32 for the image stabilization mechanism is configured with and electrically connected to a first coil 324, which corresponds to the focus adjustment magnet 22 along a direction perpendicular to the optical axis 211 and is spaced from the focus adjustment magnet 22. The first coil 324 interacts with the focus adjustment magnet 22 when being energized, so as to drive the flexible substrate 32 for the image stabilization mechanism to move in a plane orthogonal to the direction of the optical axis 211.

In this embodiment, the flexible substrate 32 for the image stabilization mechanism can supply current to the first coil 324. When the first coil 324 is supplied with current, according to Ampere's law, the first coil 324 generates a magnetic field, and the electromagnetic field of the first coil 324 interacts with a magnetic field of the focus adjustment magnet 22. Since the focus adjustment magnet 22 is installed to the first base 23, the focus adjustment magnet 22 remains stationary, so the first coil 324 can drive the flexible substrate 32 for the image stabilization mechanism to move. A magnetic pole of the focus adjustment magnet 22 is unchanged, the flexible substrate 32 for the image stabilization mechanism can control a magnitude and a direction of the current in the first coil 324, thereby controlling the direction of the magnetic pole and the intensity of the magnetic field of the first coil 324. That is, an electromagnetic force F between the first coil 324 and the focus adjustment magnet 22 can be controlled, thereby controlling movement of the flexible substrate 32 for the image stabilization mechanism, so that the flexible substrate 32 for the image stabilization mechanism can follow the movement of the image stabilization mechanism 3 inside the camera device provided by this embodiment of the present invention. A counterforce of a power line and a signal line of the flexible substrate 32 for the image stabilization mechanism applied to the image stabilization mechanism 3 is reduced, thereby improving an accuracy of the movement of the image stabilization mechanism 3, and thus improving the image clarity and user experience.

In an embodiment, with reference to FIG. 3 to FIG. 7, the flexible substrate 32 for the image stabilization mechanism includes a fixed part 321 fixed to the second base 31, a first curved surface 322 bent and extending from the fixed part 321, and a second curved surface 323 bent and extending from the first curved surface 322. The first curved surface 322 and the second curved surface 323 are parallel to the direction of the optical axis 211. The first curved surface 322 is perpendicular to the second curved surface 323. The first curved surface 322 and the second curved surface 323 are each provided with a first coil 324.

In this embodiment, since the first curved surface 322 and the second curved surface 323 where the first coil 324 is provided are parallel to the direction of the optical axis 211, if the electromagnetic force F or a component force of the electromagnetic force F generated between the first coil 324 and the focus adjustment magnet 22 when being energized is perpendicular to the bent surface 32, the first coil 324 can drive the flexible substrate 32 for the image stabilization mechanism to move on the plane orthogonal to the optical axis 211. That is, a degree of freedom of movement of the flexible substrate 32 for the image stabilization mechanism and a degree of freedom of movement of the image stabilization mechanism 3 are consistent, and a counterforce of the power line and the signal line of the flexible substrate 32 for the image stabilization mechanism applied to the image stabilization mechanism 3 is reduced, thereby improving an accuracy of the movement of the image stabilization mechanism 3, and thus improving the image clarity and user experience.

In this embodiment, the first curved surface 322 is perpendicular to the second curved surface 323, and the electromagnetic force F between the first coil 324 of the first curved surface 322 and the adjacent focus adjustment magnet 22 is perpendicular to the electromagnetic force F between the first coil 324 of the second curved surface 323 and the adjacent focus adjustment magnet 22. By adjusting the magnitudes and the directions of the two mutually perpendicular electromagnetic forces F, the flexible substrate 32 for the image stabilization mechanism can be controlled to move on the plane orthogonal to the optical axis 211. In this embodiment, the perpendicular configuration is beneficial to achieve the two-dimensional plane coordinate operation control, and the control method thereof is simple.

Figure 4:
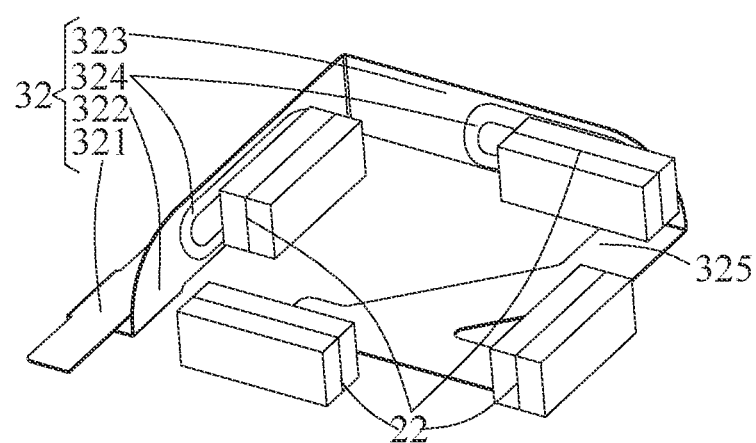
FIG. 4 is a schematic diagram illustrating a positional relationship between a flexible substrate for an image stabilization mechanism, a first coil and a focus adjustment magnet inside the camera device as shown in FIG. 1.
Figure 5:
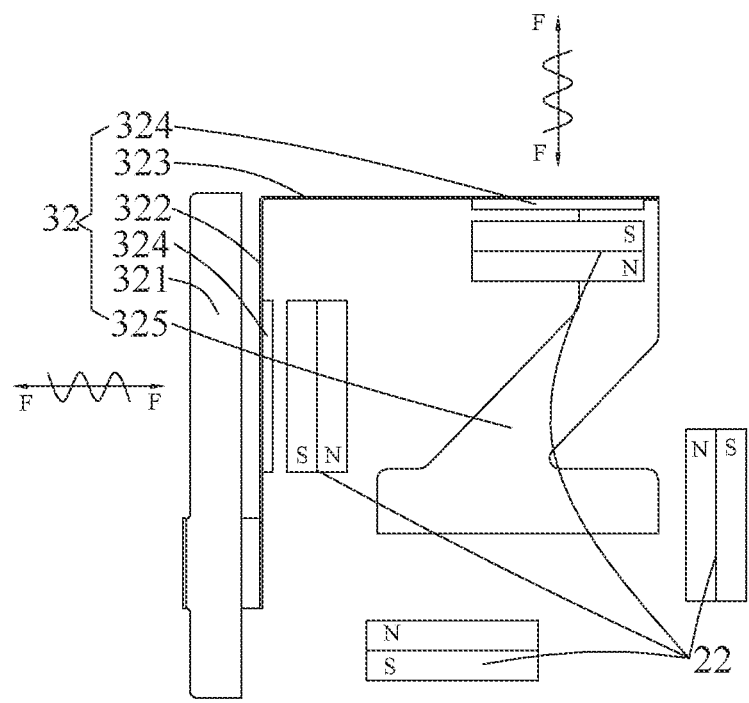
FIG. 5 is a schematic diagram illustrating an electromagnetic force between the flexible substrate for the image stabilization mechanism, the first coil and the focus adjustment magnet as shown in FIG. 4.
Figure 6:
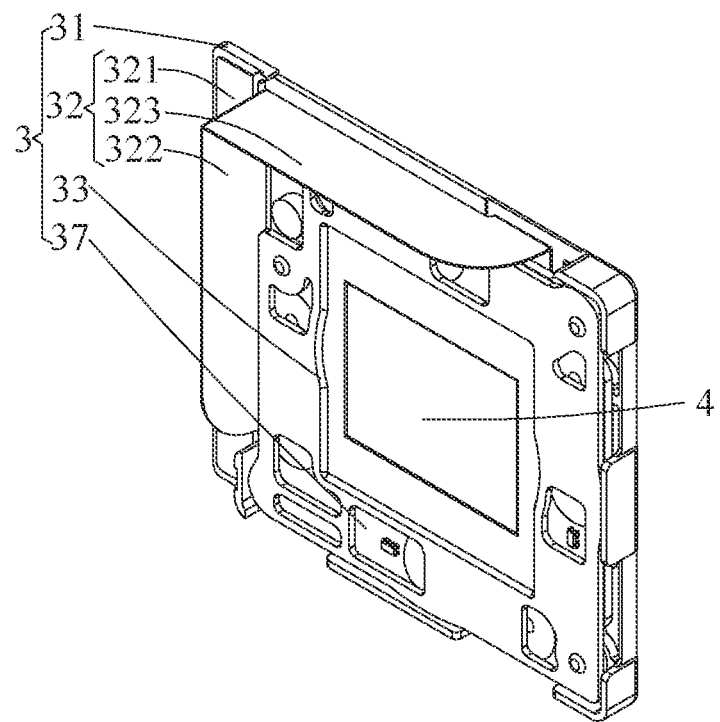
FIG. 6 is a schematic diagram illustrating matching between an image stabilization mechanism and a camera assembly inside the camera device as shown in FIG. 1.

In an embodiment, with reference to FIG. 4 to FIG. 5, the first coil 324 is a multi-layer coil winding provided on the first curved surface 322 and the second curved surface 323.

In an embodiment, when each layer of coil winding is energized, a magnetic field is generated. When the multi-layer coil winding is energized, an equivalent magnetic field is formed comprehensively, and an equivalent larger electromagnetic force F is formed between the multi-layer coil winding and the adjacent focus adjustment magnet 22. Herein, the multi-layer coil winding may be a three-dimensional spiral type or a plane spiral type. With reference to FIG. 4 and FIG. 5, in an embodiment, the multi-layer coil winding is a plane spiral type, so that the first curved surface 322 and the second curved surface 323 can be closer to the focus adjustment magnet 22, and the image stabilization mechanism 3 provided by the present invention is further miniaturized.

In an embodiment, with reference to FIG. 4 and FIG. 5, the first coil 324 is an electric-conductive circuit printed on the first curved surface 322 and the second curved surface 323.

In this embodiment, when a control circuit on the flexible substrate 32 for the image stabilization mechanism is fabricated by an electroplating printing process, the curved surface 32 of the flexible substrate 32 for the image stabilization mechanism can also be electroplated and printed with an electric-conductive circuit, so that the electric-conductive circuit acts as the first coil 324. In this way, the connection reliability is higher, and the flexible substrate 32 for the image stabilization mechanism is lighter and thinner.

In an embodiment, with reference to FIG. 3, FIG. 6, FIG. 7 and FIG. 8, the image stabilization mechanism 3 further includes a movable frame 33 supported on the second base 31, a coil 34 for image stabilization installed to the movable frame 33, and a magnet 35 for the image stabilization installed to the second base 31. The camera device further includes a camera assembly 4 installed to the movable frame 33. The coil 34 for image stabilization interacts with the magnet 35 for image stabilization when being energized, so as to drive the movable frame 33 and drive the camera assembly 4 to move in a plane orthogonal to the direction of the optical axis 211, thereby achieving correction and stabilization, and thus improving the image clarity and user experience.

In an embodiment, with reference to FIG. 4 and FIG. 5, the flexible substrate 32 for the image stabilization mechanism further includes a third curved surface 325 extending from the second curved surface 323 towards a direction perpendicular to the optical axis 211 and electrically connected to the camera assembly 4. The third curved surface 325 is configured to supply power to the camera assembly 4, and transmit and receive signals to the camera assembly 4.

Figure 7:
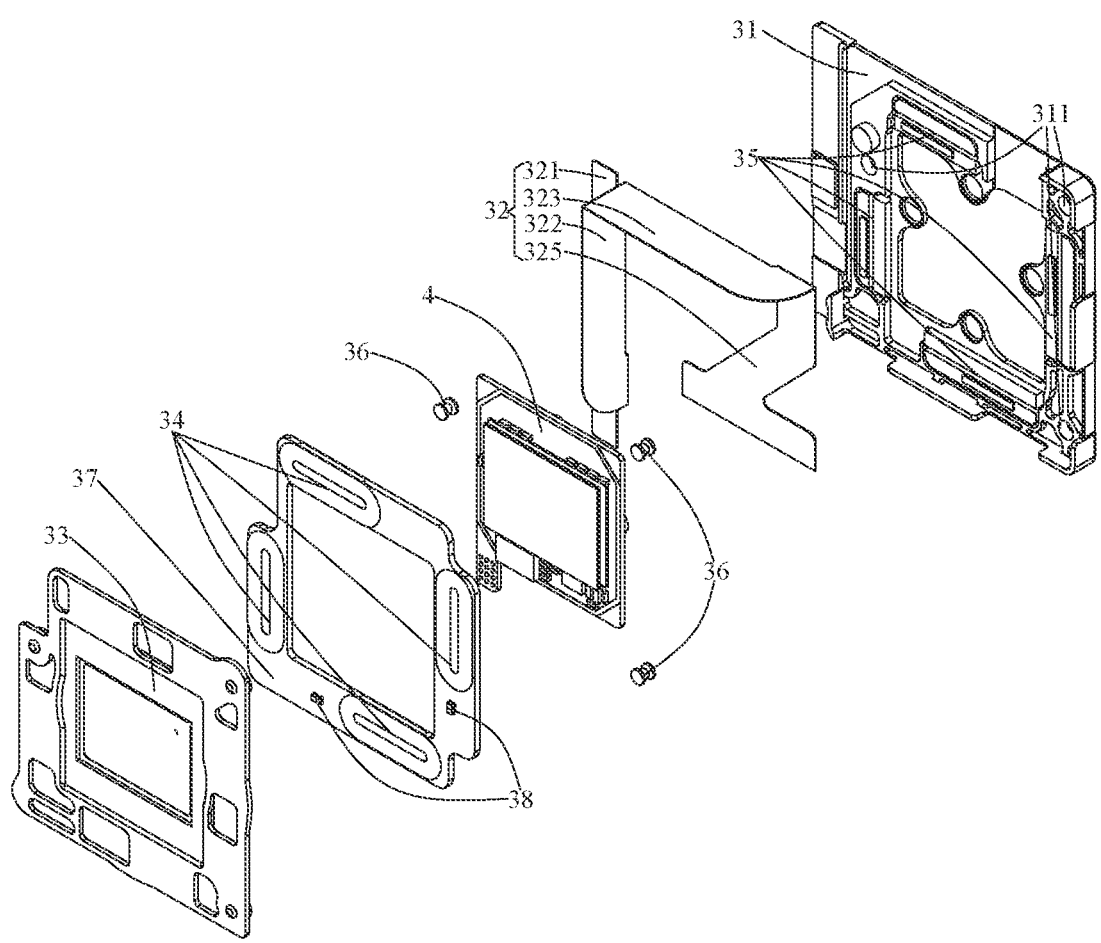
FIG. 7 is an exploded view of a structure of the image stabilization mechanism and the camera assembly as shown in FIG. 6.
Figure 8:
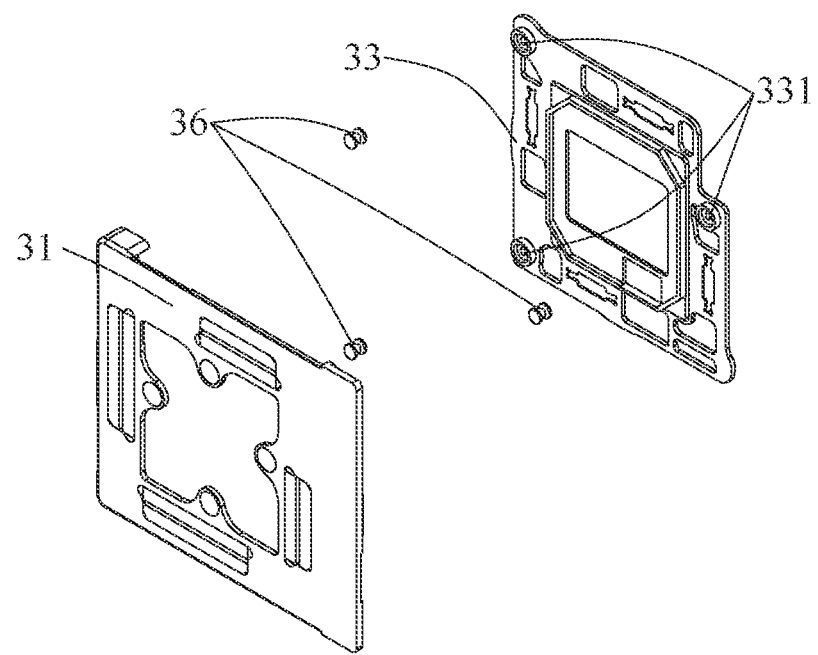
FIG. 8 is an exploded view of a structure of a second base, a support member and a movable frame as shown in FIG. 7.

In an embodiment, with reference to FIG. 7 and FIG. 8, a surface of the second base 31 facing the movable frame 33 is provided with a first groove 311, and a surface of the movable frame 33 facing the second base 31 is provided with a second groove 331 corresponding to the first groove 311. The image stabilization mechanism 3 further includes a support member 36 arranged in a receiving space formed by the first groove 311 and the second groove 331. The movable frame 33 is movably supported on the second base 31 by the support member 36, so that the movable frame 33 can move more stably in a plane orthogonal to the direction of the optical axis 211, so as to meet the plane movement accuracy required for correction and stabilization, thereby improving the image clarity and the user experience.

Figure 9:
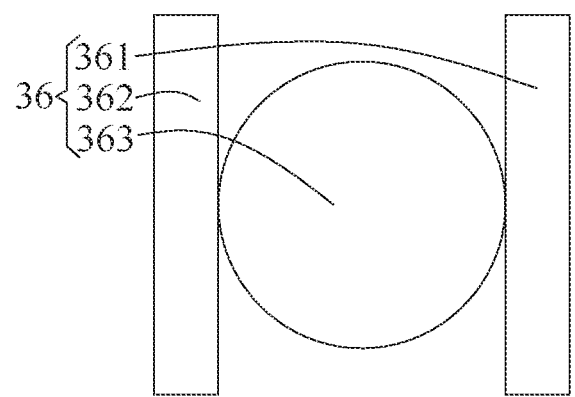
FIG. 9 is a schematic diagram of a structure of the support member as shown in FIG. 8.

In an embodiment, with reference to FIG. 8 and FIG. 9, the support member 36 includes a first support plate 361, a second support plate 362 and a ball 363. The first support plate 361 is arranged in the first groove 311. The second support plate 362 is arranged in the second groove 331. The ball 363 is in rolling contact with the first support plate 361 and the second support plate 362 respectively, and a resistance force thereof is small. Three supports 36 are provided between the second base 31 and the movable frame 33, thereby forming a plane moving pair, so that the movable frame 33 can move quickly in a plane orthogonal to the direction of the optical axis 211, so as to meet the sensitivity required for correction and stabilization, thereby improving the image clarity and the user experience.

In an embodiment, with reference to FIG. 7, the image stabilization mechanism 3 further includes an electric-conductive support plate 37 fixed to a side of the movable frame 33 facing the second base 31. The coil 34 for image stabilization is installed to the electric-conductive support plate 37, and the coil 34 for image stabilization is electrically connected to the flexible substrate 32 for the image stabilization mechanism through the electric-conductive support plate 37, so as to achieve electrical connection with an external circuit. Therefore, the magnitude and the direction of the current in the coil 34 for image stabilization can be controlled, so that a movement direction and a movement speed of movable frame 33 can be controlled, so as to meet the accuracy and sensitivity required for correction and stabilization, thereby improving the image clarity and the user experience.

In an embodiment, with reference to FIG. 7, the electric-conductive support plate 37 is further provided with a second position detection component 38. The second position detection component 38 is configured to detect the magnetic flux of the magnet 35 for image stabilization, thereby detecting a position change of the electric-conductive support plate 37 (the movable frame 33). Then, the magnitude and the direction of the current in the coil 34 for image stabilization can be controlled, so as to achieve the movement accuracy of the movable frame 33, thereby improving the image clarity and the user experience.

Figure 10:
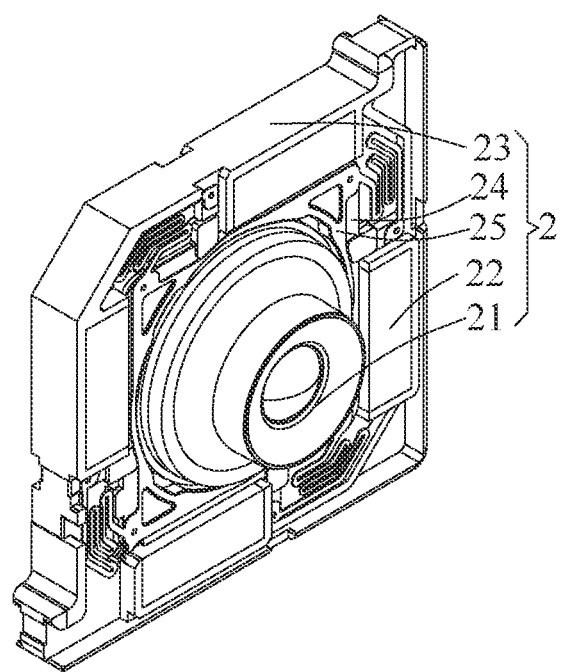
FIG. 10 is a schematic diagram of a structure of a focus adjustment mechanism inside the camera device as shown in FIG. 1.
Figure 11:
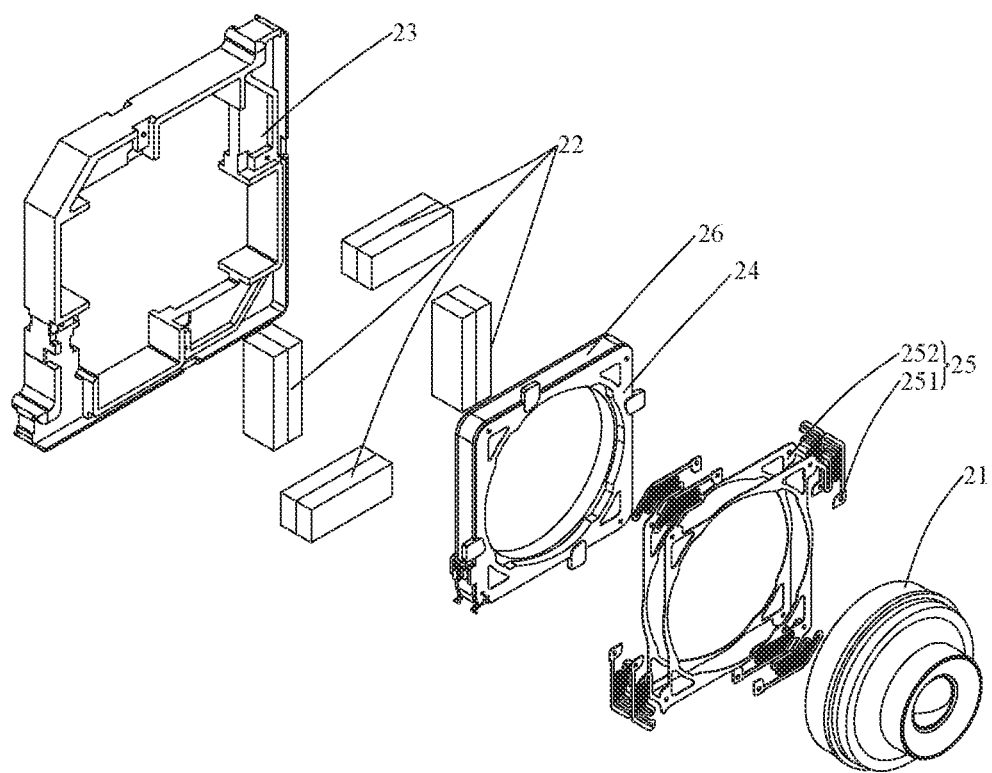
FIG. 11 is an exploded view of a structure of the focus adjustment mechanism as shown in FIG. 10.
Figure 12:
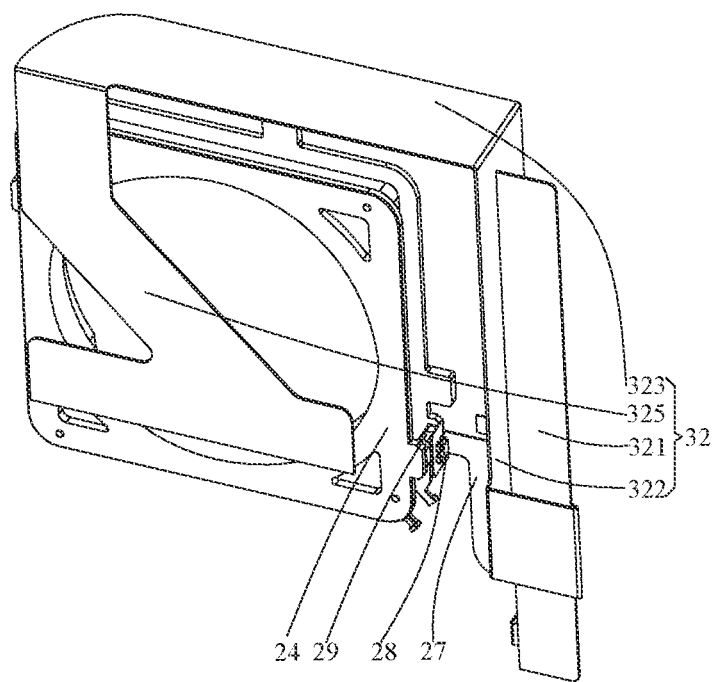
FIG. 12 is a schematic diagram illustrating matching between the flexible substrate for the image stabilization mechanism, a focus adjustment flexible substrate, an auto-focusing holder, a first position detection component and a first position detection magnet as shown in FIG. 3.

In an embodiment, with reference to FIG. 10 to FIG. 12, the focus adjustment mechanism 2 may be an auto-focusing mechanism, including an auto-focusing holder 24 sleeved on the camera lens 21 and a plate spring 25 connecting the auto-focusing holder 24 and the first base 23. The auto-focusing holder 24 is wound with a focus adjustment coil 26. The focus adjustment coil 26 corresponds to the focus adjustment magnet 22 and is spaced from the focus adjustment magnet 22. The focus adjustment coil 26 interacts with the focus adjustment magnet 22 when being energized, so as to drive the auto-focusing holder 24 and the camera lens 21 to move in the direction of the optical axis 211.

In addition, with reference to FIG. 10 and FIG. 11, the plate spring 25 makes the auto-focusing holder 24 suspended in an inner cavity of the first base 23 (a frame structure). The plate spring 25 has elasticity. When the focus adjustment coil 26 is not energized, the auto-focusing holder 24 and the camera lens 21 are reset under an elastic force of the plate spring 25. The plate spring 25 includes an upper plate spring 251 and a lower plate spring 252, and the upper plate spring 251 and the lower plate spring 252 are located at two sides of the auto-focusing holder 24 along the optical axis 211, respectively.

In an embodiment, with reference to FIG. 12, the auto-focusing holder 24 is provided with a first position detection magnet 29. The flexible substrate 32 for the image stabilization mechanism is also connected with a focus adjustment flexible substrate 27. A first position detection component 28 is mounted to the focus adjustment flexible substrate 27, and the first position detection component 28 is configured to detect the magnetic flux of the first position detection magnet 29, thereby detecting a position change of the camera lens 21 disposed at the auto-focusing holder 24. Then, the magnitude and the direction of the current in the focus adjustment coil 26 can be controlled, so as to achieve the focusing accuracy, thereby improving the image clarity and the user experience.

Figure 3:
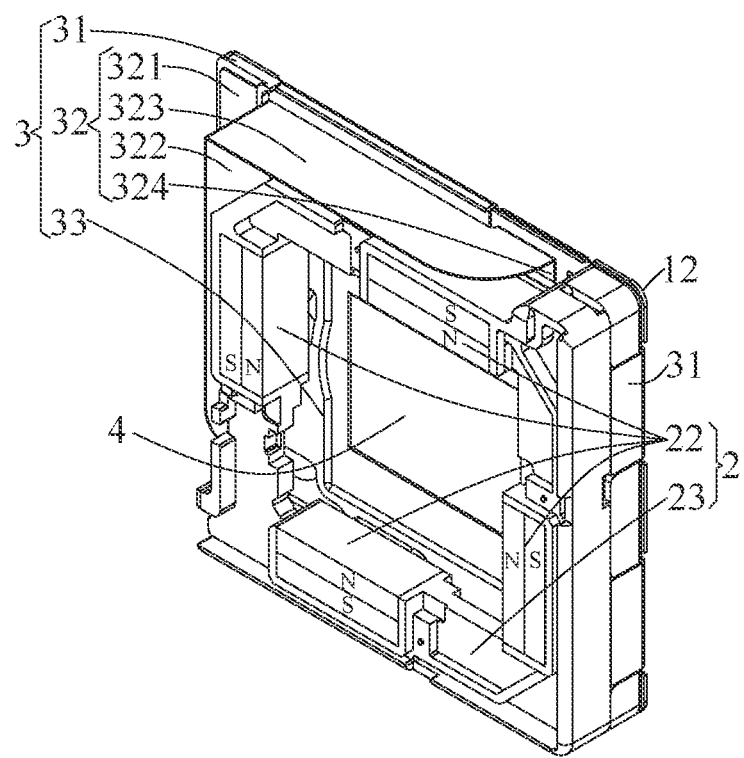
FIG. 3 is a schematic diagram illustrating a positional relationship between a flexible substrate for an image stabilization mechanism and a focus adjustment magnet inside the camera device as shown in FIG. 1.
Figure 13:
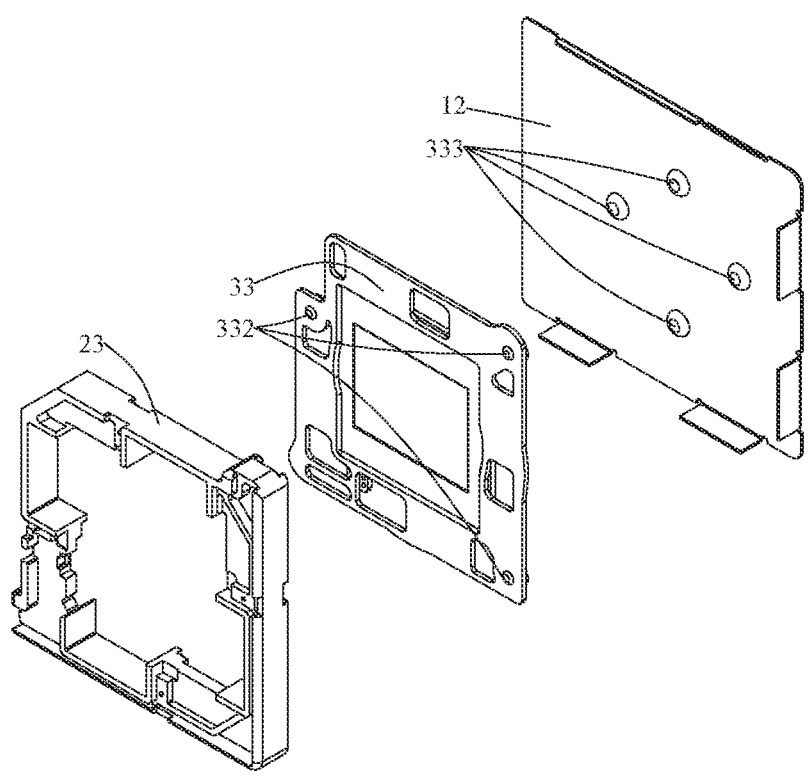
FIG. 13 is a schematic diagram illustrating matching between a first base, a movable frame, a rear case body, an anti-vibration buffer and a heat dissipation gel as shown in FIG. 3.

In the above embodiments, with reference to FIG. 1, FIG. 3 and FIG. 13, the case 1 includes a front case body 11 and a rear case body 12. The focus adjustment mechanism 2 and the image stabilization mechanism 3 are disposed in the front case body 11. The rear case body 12 coves the front case body 11, so that the focus adjustment mechanism 2 and the image stabilization mechanism 3 are disposed in the receiving cavity 13 of the case 1.

In the above embodiments, with reference to FIG. 13, an anti-vibration buffer 332 is provided at a side of the movable frame 33 facing the first base 23 and is configured to abut against the first base 23. The anti-vibration buffer 332 is, for example, a vibration damping gel, which can dampen the vibration of the image stabilization mechanism 3, thereby achieving correction of the stabilization accuracy, and thus improving the image clarity and the user experience. In addition, when the camera device is dropped, the anti-vibration buffer 332 can alleviate an impact force resulting from the dropping to prevent a damage of the parts of the image stabilization mechanism and the focus adjustment mechanism, and can also prevent the generated dust.

In the above embodiments, with reference to FIG. 13, a heat dissipation gel 333 is provided at a side of the rear case body 12 facing the movable frame 33, and is configured to abut against the camera assembly 4, so that the heat generated by the camera assembly 4 during operation is transferred to the rear case body 12 through the heat dissipation gel 333. The rear case body 12 has a large area and is made of a metal material, thereby being beneficial to rapid transfer of the heat to an external environment of the camera device, so that the temperature of the camera assembly 4 is within a normal working temperature range. In this way, the reliability of the camera device is improved.

Figure 14:
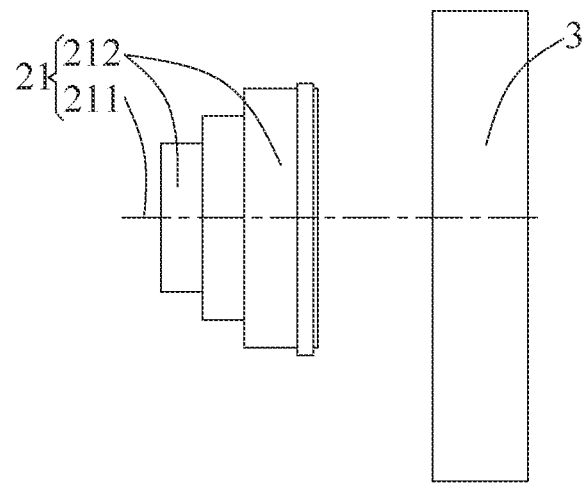
FIG. 14 is a schematic diagram of a structure of a focus adjustment mechanism inside the camera device as shown in FIG. 1, where the focus adjustment mechanism is a zoom mechanism.

With reference to FIG. 14, the focus adjustment mechanism 2 may also be a zoom mechanism. The camera lens 21 includes at least two lenses 212 spaced from each other in the direction of the optical axis 211, and the zoom mechanism can change a distance between the two lenses 212 along the direction of the optical axis 211, thereby achieving a zoom function of the camera device.

Figure 15:
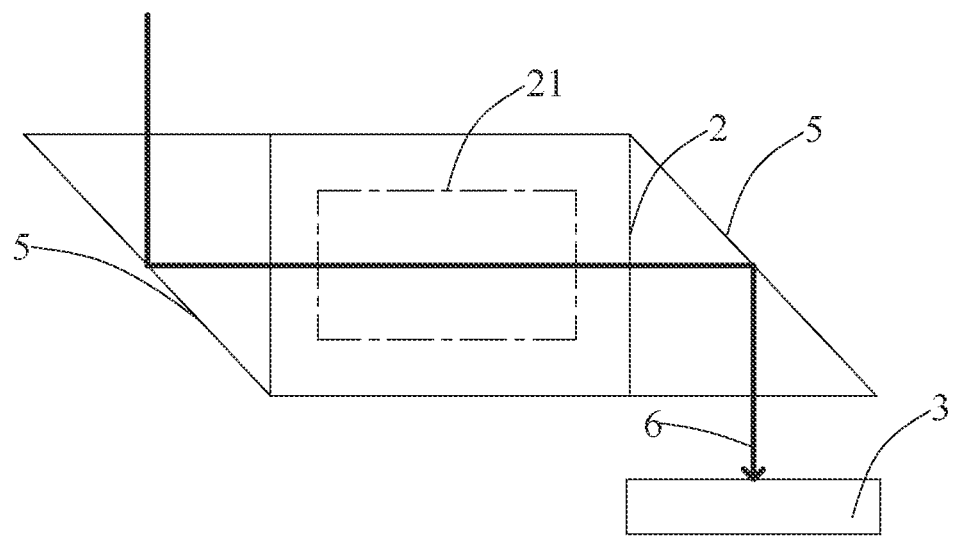
FIG. 15 is a schematic diagram of a structure of a prism inside the camera device as shown in FIG. 1.

With reference to FIG. 15, the camera device may further include a prism 5 located at an object side of the camera lens 21 and/or an image side of the camera lens 21, and the prism 5 is configured to change a direction of an optical path 6, so that the camera device provided by the present invention can shoot objects parallel to or non-parallel to the optical axis 211 of the camera lens 21, thereby meeting the needs of users in different environments.

The above-described embodiments are merely preferred embodiments of the present invention and are not intended to limit the present invention. Various changes and modifications can be made to the present invention by those skilled in the art. Any modifications, equivalent substitutions and improvements made within the principle of the present invention shall fall into the protection scope of the present invention.

What is claimed is:

1. A camera device, comprising:
a case having a receiving cavity;
a focus adjustment mechanism received in the receiving cavity and installed to a camera lens having an optical axis; and
an image stabilization mechanism received in the receiving cavity, wherein the image stabilization mechanism and the focus adjustment mechanism are arranged along a direction of the optical axis,
wherein the focus adjustment mechanism comprises a focus adjustment magnet and a first base, the first base is arranged at an object side of the image stabilization mechanism along the direction of the optical axis, and the focus adjustment magnet is arranged at the first base;
wherein the image stabilization mechanism comprises a second base and a flexible substrate for the image stabilization mechanism fixed to the second base, the flexible substrate for the image stabilization mechanism is configured with and electrically connected to a first coil, the first coil corresponds to the focus adjustment magnet and is spaced from the focus adjustment magnet in a direction perpendicular to the direction of the optical axis, and the first coil interacts with the focus adjustment magnet when being energized, to drive the flexible substrate for the image stabilization mechanism to move in a plane orthogonal to the direction of the optical axis;
wherein the flexible substrate for the image stabilization mechanism comprises a fixed part fixed to the second base, a first curved surface bent and extending from the fixed part and a second curved surface bent and extending from the first curved surface; the first curved surface and the second curved surface are parallel to the direction of the optical axis, the first curved surface is perpendicular to the second curved surface, the first curved surface and the second curved surface are each provided with the first coil; the first coil is a multi-layer coil winding configured on each of the first curved surface and the second curved surface, or the first coil is an electric-conductive circuit printed on each of the first curved surface and the second curved surface.

2. The camera device as described in claim 1, wherein the image stabilization mechanism further comprises a movable frame supported on the second base, a coil for image stabilization installed to the movable frame, and a magnet for image stabilization installed to the second base; and the camera device further comprises a camera assembly installed to the movable frame;
wherein the coil for image stabilization interacts with the magnet for image stabilization when being energized, so as to drive the movable frame to drive the camera assembly to move in a plane orthogonal to the direction of the optical axis.

3. The camera device as described in claim 2, wherein the flexible substrate for the image stabilization mechanism further comprises a third curved surface extending from the second curved surface in a direction perpendicular to the direction of the optical axis and electrically connected to the camera assembly.

4. The camera device as described in claim 2, wherein a surface of the second base facing the movable frame is provided with a first groove, a surface of the movable frame facing the second base is provided with a second groove corresponding to the first groove, and the image stabilization mechanism further comprises a support member received in a receiving space formed between the first groove and the second groove; and the movable frame is movably supported on the second base through the support member.

5. The camera device as described in claim 2, wherein the image stabilization mechanism further comprises an electric-conductive support plate fixed to a side of the movable frame facing the second base, and the coil for image stabilization is carried by the electric-conductive support plate and electrically connected to the flexible substrate for the image stabilization mechanism through the electric-conductive support plate to achieve electrical connection with an external circuit.

6. The camera device as described in claim 1, wherein the focus adjustment mechanism is an auto-focusing mechanism, comprising an auto-focusing holder sleeved on the camera lens and a plate spring connecting the auto-focusing holder and the first base;

wherein the auto-focusing holder is wound with a focus adjustment coil, the focus adjustment coil corresponds to the focus adjustment magnet and is spaced from the focus adjustment magnet, the focus adjustment coil interacts with the focus adjustment magnet to drive the auto when being energized, so as to drive the auto-focusing holder and the camera lens are to move along the direction of the optical axis.

7. The camera device as described in claim 1, wherein the focus adjustment mechanism is a zoom mechanism, the camera lens comprises at least two lenses arranged along the direction of the optical axis and spaced from each other, and the zoom mechanism is capable of changing a distance between the two lenses along the direction of the optical axis.

8. The camera device as described in claim 1, further comprising a prism located at one or both of an object side of the camera lens and an image side of the camera lens, wherein the prism is configured to change the direction of an optical path.

* * * * *